US012706335B2

(12) United States Patent
Lee

(10) Patent No.: US 12,706,335 B2
(45) Date of Patent: Aug. 11, 2026

(54) DEVICE FOR HEATING BATTERY CELL AND METHOD OF HEATING BATTERY CELL USING THE SAME

(71) Applicant: SK ON CO., LTD., Seoul (KR)

(72) Inventor: Sung Woo Lee, Daejeon (KR)

(73) Assignee: SK On Co., Ltd., Seoul (KR)

( * ) Notice: Subject to any disclaimer, the term of this patent is extended or adjusted under 35 U.S.C. 154(b) by 572 days.

(21) Appl. No.: 18/311,238

(22) Filed: May 3, 2023

(65) Prior Publication Data

US 2024/0039085 A1 Feb. 1, 2024

(30) Foreign Application Priority Data

Jul. 27, 2022 (KR) ........................ 10-2022-0093378

(51) Int. Cl.
*H01M 10/6595* (2014.01)
*H01M 10/48* (2006.01)
*H01M 10/658* (2014.01)

(52) U.S. Cl.
CPC ....... *H01M 10/6595* (2015.04); *H01M 10/48* (2013.01); *H01M 10/658* (2015.04)

(58) Field of Classification Search
None
See application file for complete search history.

(56) References Cited

U.S. PATENT DOCUMENTS

2013/0127473 A1 5/2013 Ikeda
2016/0111750 A1* 4/2016 Tanida ................. H01M 50/119 29/623.2
2020/0036068 A1 1/2020 Recoskie et al.

FOREIGN PATENT DOCUMENTS

CN 208872856 U 5/2019
JP 5086496 B2 11/2012
KR 10-1997-0054649 A 7/1997
KR 10-2017-0042082 A 4/2017
KR 10-2019-0108133 A 9/2019
WO 2017/209327 A1 12/2017

OTHER PUBLICATIONS

Fredrik Larsson et al., Lithium-Ion Battery Aspects on Fires in Electrified Vehicles on the Basis of Experimental Abuse Tests, Batteries, Apr. 11, 2016, pp. 1-13, vol. 2, MDPI.
Notice of Allowance (=Notification to Grant Patent Right for Invention) for Korean Patent Application No. 10-2022-0093378 issued by the Korean Patent Office on May 22, 2026.

* cited by examiner

*Primary Examiner* — Carlos Barcena
(74) *Attorney, Agent, or Firm* — IP & T GROUP LLP

(57) ABSTRACT

A device for heating a battery cell including an electrode assembly accommodated in a case and an electrode lead connected to the electrode assembly and having at least a portion disposed outside of the case includes a cell fixing portion in which at least one battery cell is disposed; and a heating unit configured to partially supply thermal energy to the battery cell, wherein the heating unit supplies thermal energy to the electrode lead disposed outside of the case.

12 Claims, 9 Drawing Sheets

DEVICE FOR HEATING BATTERY CELL AND METHOD OF HEATING BATTERY CELL USING THE SAME

CROSS-REFERENCE TO RELATED APPLICATION(S)

This patent document claims the priority and benefits of Korean Patent Application No. 10-2022-0093378 filed on Jul. 27, 2022 the disclosure of which is incorporated herein by reference in its entirety.

TECHNICAL FIELD

The technology and implementations disclosed in this patent document generally relate to a device for heating a battery cell and a method of heating a battery cell using the same.

BACKGROUND

Differently from a primary battery, a secondary battery, such as a battery cell, may be charged and discharged with electrical energy, and may be applied to devices within various fields such as a digital camera, a mobile phone, a laptop computer, and a hybrid vehicle. Secondary batteries may include a nickel-cadmium battery, a nickel-metal hydride battery, a nickel-hydrogen battery, and a lithium secondary battery.

A secondary battery may include a pouch-type secondary battery and a can-type secondary battery according to a material of a case accommodating an electrode assembly. In the pouch-type secondary battery, an electrode assembly may be accommodated in a pouch formed of a flexible polymer material having an irregular shape. In the can-type secondary battery, an electrode assembly may be accommodated in a case formed of a material such as metal or plastic and having a predetermined shape.

A plurality of battery cells may be used in a module unit in which a plurality of cells are stacked side by side. Accordingly, when a fire/explosion occurs in one of the battery cells, thermal runaway in which the flame/explosion is consecutively spread through the entire battery cell array may occur.

Accordingly, various studies have been conducted to prevent thermal runaway, and a device or a method for intentionally generating thermal runaway may be necessary.

SUMMARY

The disclosed technology may be implemented in some embodiments to provide a device for heating a battery cell which may cause thermal runaway and a method of heating a battery cell using the same.

In some embodiments of the disclosed technology, a device for heating a battery cell including an electrode assembly accommodated in a case and an electrode lead connected to the electrode assembly and having at least a portion disposed outside of the case includes a cell fixing portion in which at least one battery cell is disposed; and a heating unit configured to partially supply thermal energy to the battery cell, wherein the heating unit supplies thermal energy to the electrode lead disposed outside of the case.

The heating unit may continuously generate flames to supply thermal energy.

The heating unit may include a nozzle in which flames are formed and a fuel pipe configured to supply fuel to the nozzle.

The heating unit may generate flames in a position spaced apart from the case by a predetermined distance.

The device may further include a blocking unit disposed between the case and the heating unit and configured to block thermal energy from being directly transferred to the case.

The electrode lead may include a negative electrode lead and a positive electrode lead, and the heating unit supplies thermal energy to the negative electrode lead.

The cell fixing portion may include first and third plates having a fixed spacing distance therebetween; a second plate disposed to move between the first plate and the third plate; and a pressure measuring portion disposed between the second plate and the third plate and configured to measure a change in pressure of a battery cell disposed between the first plate and the second plate.

The cell fixing portion may further include a fastening member coupled to the first plate and the third plate and configured to fix a spacing distance therebetween.

The heating unit may be disposed to face the electrode lead on an external side of the third plate.

The third plate may be disposed such that at least a portion thereof may face the electrode lead, at least one accommodation portion having a groove shape may be formed in a portion of the third plate facing the electrode lead, and the heating unit may be coupled to the accommodation portion to be detachable therefrom.

In some embodiments of the disclosed technology, a device for heating a battery cell including an electrode assembly accommodated in a case and an electrode lead connected to the electrode assembly and having at least a portion disposed outside of the case includes a cell fixing portion in which at least one battery cell is disposed; and a heating unit configured to partially supply thermal energy to the battery cell, wherein the electrode assembly receives thermal energy through the electrode lead.

In some embodiments of the disclosed technology, a method of heating a battery includes disposing a battery cell including an electrode assembly accommodated in a case and an electrode lead connected to the electrode assembly and having at least a portion disposed outside of the case on a cell fixing portion; and partially supplying thermal energy to the battery cell, wherein the supplying the thermal energy includes heating the electrode lead disposed outside of the case using flames.

The method may further include measuring a change in internal pressure of the battery cell through a load cell while thermal energy is supplied.

BRIEF DESCRIPTION OF DRAWINGS

Certain aspects, features, and advantages of the disclosed technology are illustrated by the following detailed description with reference to the accompanying drawings.

DETAILED DESCRIPTION

Figure 1:
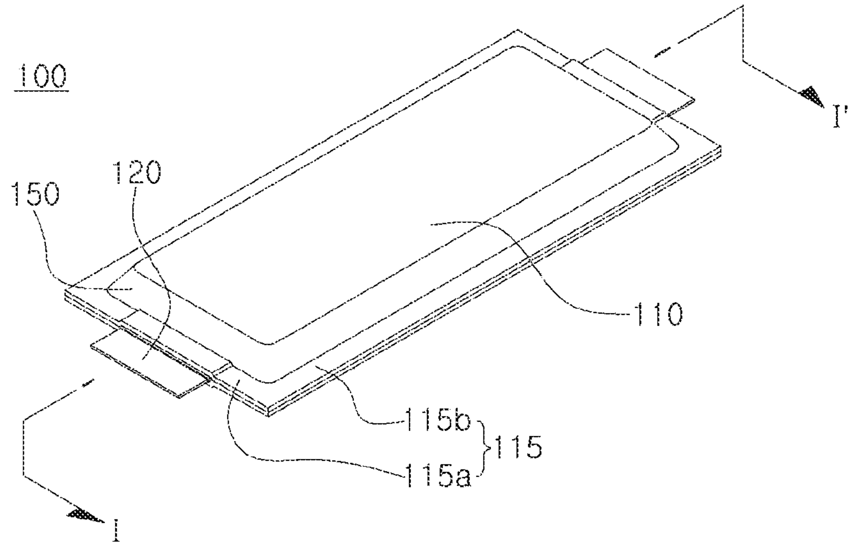
FIG. 1 is a perspective diagram illustrating a battery cell according to an embodiment of disclosed technology.

Features of the disclosed technology disclosed in this patent document are described by embodiments with reference to the accompanying drawings.

In the drawings, same elements will be indicated by same reference numerals. Overlapping descriptions and detailed descriptions of known functions and elements which may unnecessarily make the gist of the present disclosure obscure will not be provided. In the accompanying drawings, a portion of elements may be exaggerated, omitted or briefly illustrated, and the sizes of the elements may not necessarily reflect the actual sizes of these elements.

In embodiments, terms such as an upper side, an upper portion, a lower side, a lower portion, a side surface, and the like, are represented based on the directions in the drawings, and may be used differently if the direction of an element is changed.

Figure 2:
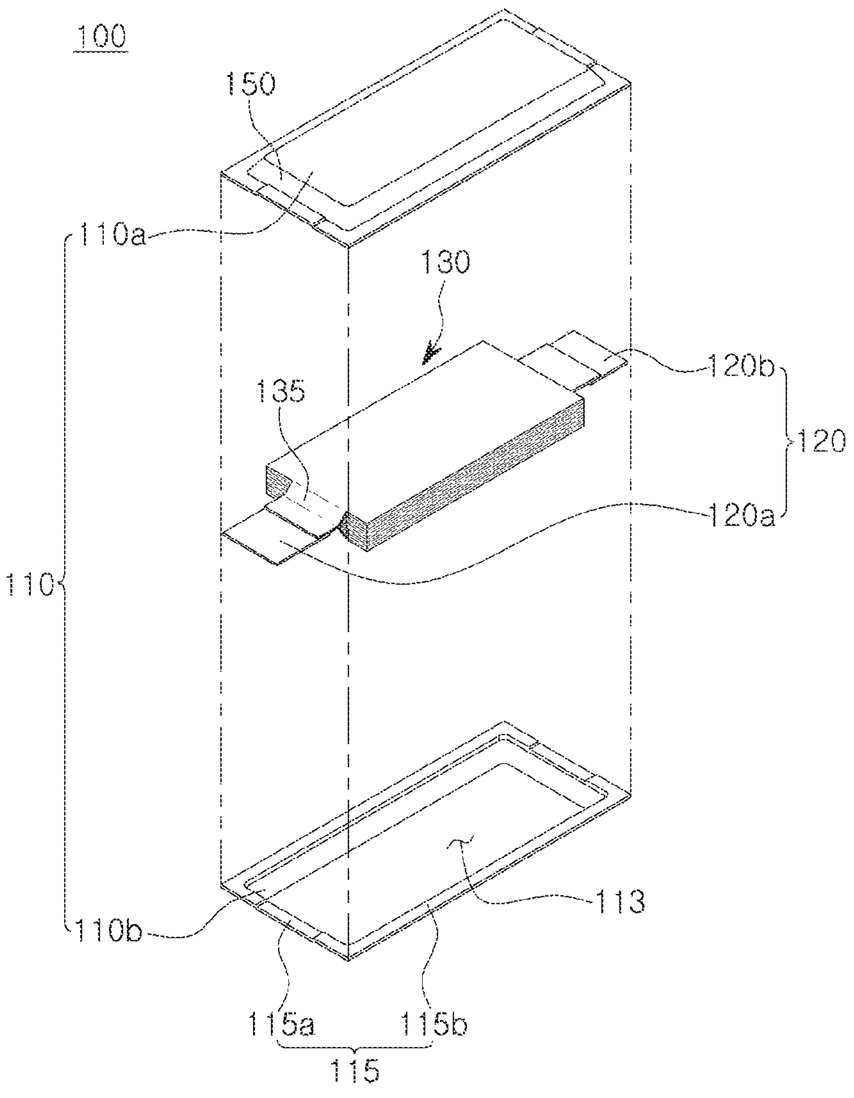
FIG. 2 is an exploded perspective diagram illustrating the battery cell illustrated in FIG. 1.
Figure 3:
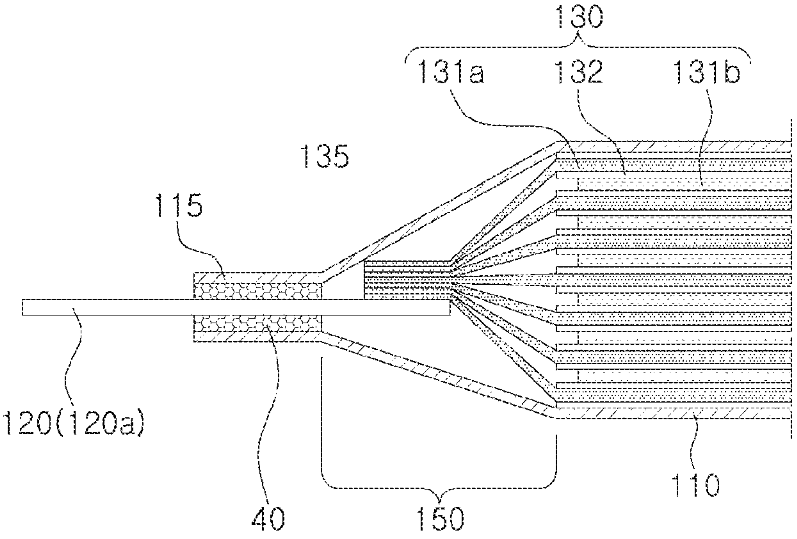
FIG. 3 is a cross-sectional diagram along the line I-I' illustrating a portion of the battery cell illustrated in FIG. 1.

FIG. 1 is a perspective diagram illustrating a battery cell according to an embodiment. FIG. 2 is an exploded perspective diagram illustrating the battery cell illustrated in FIG. 1. FIG. 3 is a cross-sectional diagram along the line I-I' illustrating a portion of the battery cell illustrated in FIG. 1.

Referring to FIGS. 1 to 3, the battery cell 100 according to the embodiment may include an electrode assembly 130 and a case 110 accommodating the same.

The battery cell 100 according to the embodiment may be implemented as a secondary battery able to be charged and discharged, and may include a lithium ion (Li-ion) battery or a nickel metal hydride (Ni-MH) battery. A nickel metal hydride battery may be a secondary battery using nickel for the anode, hydrogen occlusion alloy for a cathode, and an aqueous alkali solution as an electrolyte, and may have a large capacity per unit volume, such that the nickel metal hydride battery may be used as an energy source for electric vehicles (EV) or hybrid vehicles (HEV), and may also be used in various fields such as energy storage.

The battery cell 100 may have a pouch-type structure.

The case 110 may be used, for example, by insulating the surface of a metal layer formed of aluminum. The insulation may be formed by applying modified polypropylene as polymer resin to the surface of the metal layer, and laminating a resin material such as nylon or polyethylene terephthalate (PET) on the external side of the layer.

The case 110 may include an accommodation space 113 in which the electrode assembly 130 is accommodated.

The case 110 may be formed by sealing the accommodation space 113 by bonding the edges at which the first case 110*b* and the second case 110*a* are in contact with each other. As a bonding method of the edge, a thermal fusion method may be used, but the method is not limited thereto. Hereinafter, the bonded edge portion may be referred to as a sealing portion 115.

The sealing portion 115 may be formed in the form of a flange extending outwardly from the accommodation space 113 described above. Accordingly, the sealing portion 115 may be disposed along the outer periphery of the accommodation space 113.

In the embodiment, the sealing portions 115 may be disposed on the four surfaces of the battery cell 100, but the battery cell 100 may be configured such that an exterior material may be folded such that the sealing portions 115 are only disposed on the three surfaces.

In the embodiment, the sealing portion 115 may include a first sealing portion 115*a* in which the electrode lead 120 is disposed and a second sealing portion 115*b* in which the electrode lead 120 is not disposed.

The electrode assembly 130 may be accommodated together with the electrolyte in the accommodation space 113 of the case 110. The electrode assembly 130 may include a plurality of electrodes 131*a* and 131*b* including a positive electrode plate 131*a* and a negative electrode plate 131*b*, and a separator 132 disposed between the positive electrode plate 131*a* and the negative electrode plate 131*a* and electrically/physically separating the positive electrode plate 131*a* from the negative electrode plate 131*b*.

The electrodes 131*a* and 131*b* may be formed by coating a positive electrode active material or a negative electrode active material on one side or both sides of a metal thin film. Also, the electrode assembly 130 may be provided in a form in which a plurality of positive electrode plates 131*a* and a plurality of negative electrode plates 131*b* are alternately stacked.

The electrode assembly 130 may include an electrode tab 135. The electrode tab 135 may include a positive electrode tab extending from the positive electrode plate 131*a* and a negative electrode tab extending from the negative electrode plate 131*b*.

The electrode tab 135 may be accommodated in the terrace (150 in FIG. 3). In the embodiment, the terrace 150 may correspond to the circumference of the portion of the case 110 accommodating the electrode assembly 130. Also, the terrace 150 may be defined as a portion corresponding to a region between the electrode assembly 130 and the sealing portion 115 of the case 110.

In the embodiment, the electrode tab 135 may be drawn out toward the first sealing portion 115*a*. Accordingly, the terrace 150 in the embodiment may include a region between the electrode assembly 130 and the first sealing portion 115*a*.

However, even when the electrode tab 135 is not accommodated, a free space formed between the electrode assembly 130 and the sealing portion 115, or a portion not pressurized (or in contact) between battery cells 100 when stacking battery cells may be included in the terrace 150. For example, the terrace 150 may include a region in which the thickness of the battery cell 100 may gradually decrease toward the sealing portion 115 side.

An electrode lead 120 electrically connecting the battery cell 100 to another external device may be connected to the electrode tab 135. One end of the electrode lead 120 may be bonded to the electrode tab 135 and may be electrically connected to the electrode assembly 130, and the other end may be exposed to the outside of the case 110.

The electrode lead 120 may include a positive electrode lead 120*a* connected to the positive electrode plate 131*a* and a negative electrode lead 120*b* connected to the negative electrode plate 131*b*.

The positive electrode lead 120*a* and the negative electrode lead 120*b* may be formed of metal in the form of a thin plate. For example, the positive electrode lead 120*a* may be formed of aluminum (Al) material, and the negative electrode lead 120*b* may be formed of copper (Cu) material. However, an embodiment thereof is not limited thereto.

In the embodiment, the positive electrode lead 120*a* and the negative electrode lead 120*b* may be disposed to be oriented in opposite directions, such that the positive electrode lead 120*a* and the negative electrode lead 120*b* may protrude from both side surfaces of the case 110. However, an embodiment thereof is not limited thereto, and various modifications may be made, such as disposing the positive electrode lead 120*a* and the negative electrode lead 120*b* to be oriented in the same direction.

A protective film 40 may be inserted and disposed between the electrode lead 120 and the first sealing portion 115*a*. The protective film 40 may be configured in the form of an insulating tape to improve bonding strength between the electrode lead 120 and the first sealing portion 115*a*.

Subsequently, a device for heating the above-described battery cell will be described.

Figure 4:
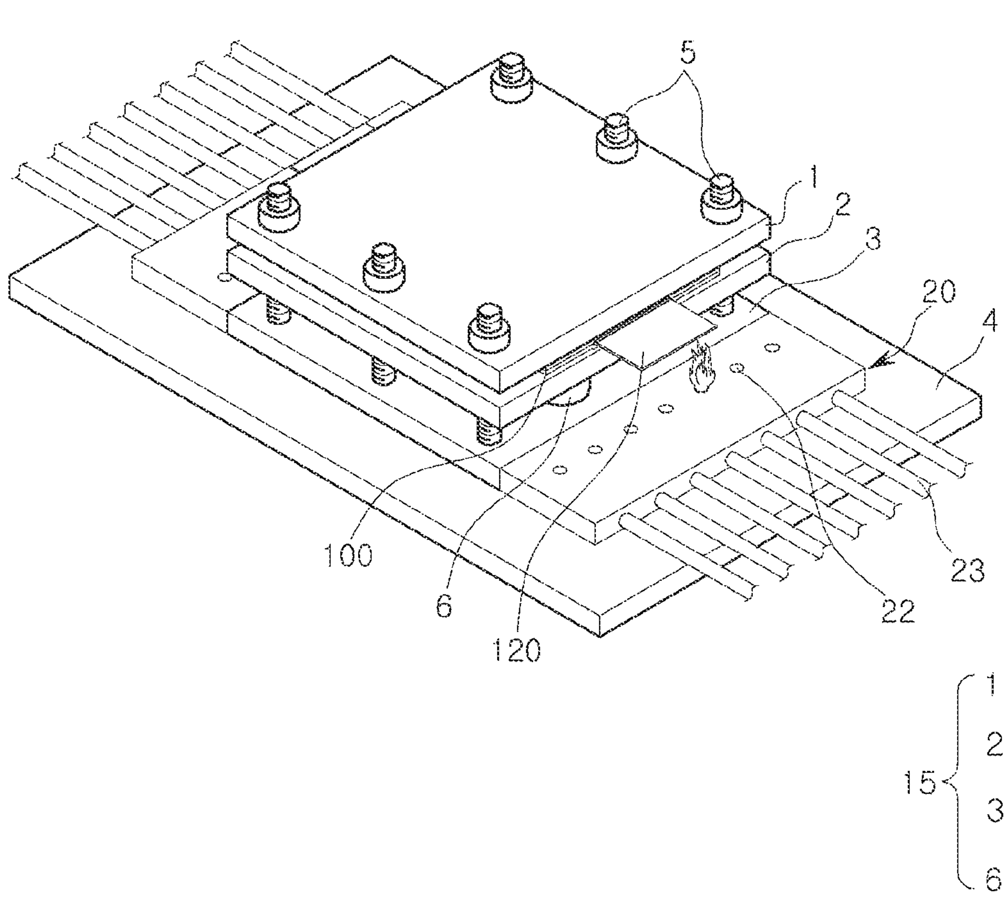
FIG. 4 is a perspective diagram illustrating a device for heating a battery cell according to an embodiment of disclosed technology.
Figure 5:
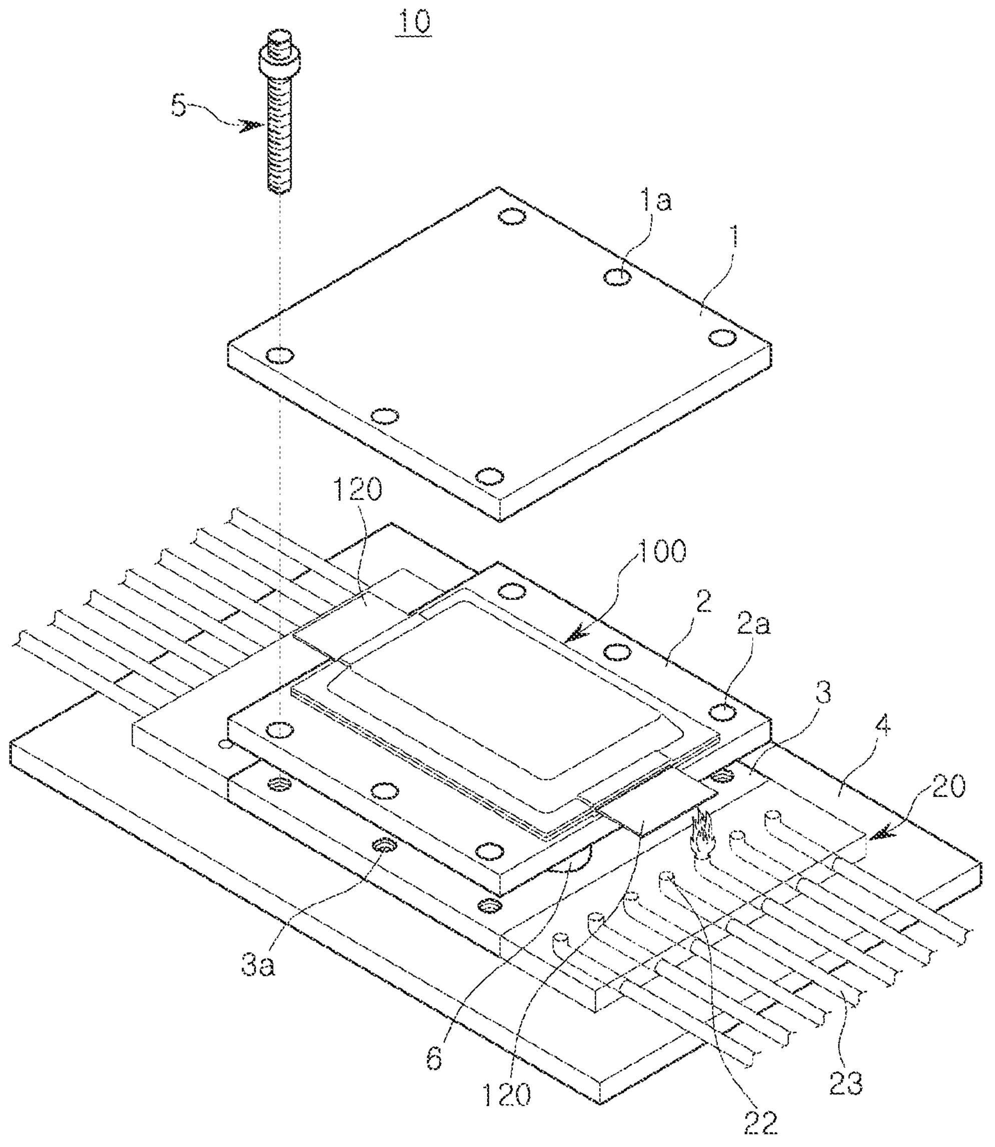
FIG. 5 is an exploded perspective diagram illustrating the device for heating a battery cell illustrated in FIG. 4.
Figure 6:
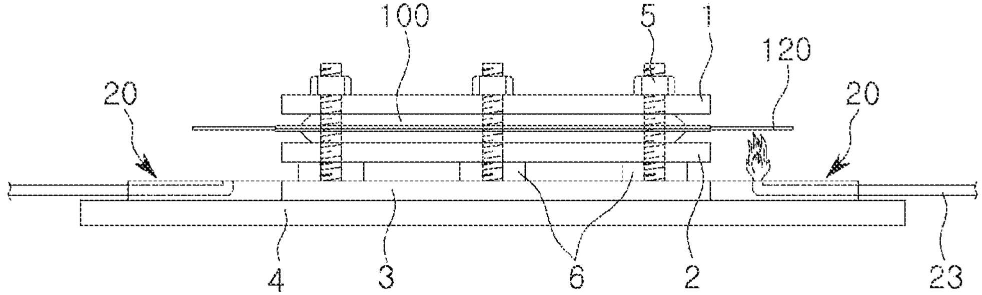
FIG. 6 is a diagram illustrating the device for heating a battery cell illustrated in FIG. 4, viewed laterally.

FIG. 4 is a perspective diagram illustrating a device for heating a battery cell according to an embodiment. FIG. 5 is an exploded perspective diagram illustrating the device for heating a battery cell illustrated in FIG. 4. FIG. 6 is a diagram illustrating the device for heating a battery cell illustrated in FIG. 4, viewed laterally.

Referring to FIGS. 4 to 6 together, the device 10 in the embodiment may be used to test a battery module or a battery pack including a battery cell 100 or a plurality of battery cells 100.

More specifically, the device 10 may be used to simulate adverse conditions encountered by the battery cell 100. For example, the embodiment of device 10 may be used to implement potentially dangerous circumstances which may occur while a battery is used.

The above potentially dangerous circumstances may include overheating due to short circuit of the battery cell 100, overheating due to overcharging, physical shock, and temperature increase due to external heat.

When ignition or explosion starts in one of the battery cells 100 due to the above circumstances, thermal runaway in which flame or explosion spreads consecutively through adjacent battery cells 100 may occur. Accordingly, the device 10 in the embodiment may be used to implement a circumstance in which thermal runaway may start in one of the battery cells 100.

To this end, the device 10 in the embodiment may include a cell fixing portion 15 in which the battery cell 100 is disposed, and a heating unit 20 for partially supplying thermal energy to the battery cell 100.

The cell fixing portion 15 may include first and third plates 1 and 3 as fixed plates, a second plate 2 as a movable plate, and a pressure measuring portion 6.

Each of the first to third plates 1, 2, and 3 may be configured to have rigidity such that the plates may not deform or break while the battery cell 100 is heated.

The first to third plates 1, 2, and 3 may be stacked parallel to each other, and may be spaced apart from each other so as not to be in contact with each other. Also, the battery cell 100, an object to be measured, may be inserted and disposed between the first and second plates 1 and 2, and the pressure measuring portion 6 may be inserted and disposed between the second and third plates 2 and 3.

The first plate 1 may be disposed on the uppermost portion and may be seated on the object to be measured. Also, the second plate 2 may be disposed below the object to be measured, and may be disposed to move by expansion of the object to be measured and may press the pressure measuring portion 6.

The first and second plates 1 and 2 may be formed with an area larger than that of the object to be measured, and through-holes 1*a* and 2*a* into which fastening members such as bolts are inserted may be formed on both sides thereof.

The third plate 3 may be disposed below the second plate 2 and may have a fastening groove 3*a* to which the fastening member 5 is coupled. A thread may be formed in the fastening groove 3*a* for coupling with the fastening member 5.

In the embodiment, the third plate 3 may be coupled to the base 4. However, an embodiment thereof is not limited thereto, and the base 4 may not be provided as long as the third plate 3 may be stably fixed.

The fastening member 5 may fasten the first plate 1 and the third plate 3 to each other. Accordingly, one end (e.g. a bolt head) of the fastening member 5 may be coupled to the first plate 1, and the other end may penetrate the second plate 2, may be inserted into the fastening groove 3*a* of the third plate 3 and may be coupled to the third plate 3.

The fastening member 5 may define the spacing distance between the first plate 1 and the third plate 3. That is, the spacing distance between the first plate 1 and the third plate 3 may be fixed by the fastening member 5. The second plate 2 may be disposed to move between the first plate 1 and the third plate 3 in the length direction of the fastening member 5.

The fastening member 5 according to the embodiment may be configured with double bolts such that the spacing distance between the first plate 1 and the third plate 3 may not change. However, an embodiment thereof is not limited thereto, and various members, such as a jig, may be used as long as the spacing distance between the first plate 1 and the third plate 3 may be maintained while pressure is measured.

The second plate 2 may include a plurality of through-holes 2*a* through which the fastening member 5 is disposed. Accordingly, the diameter of the through-hole 2*a* may be larger than that of the fastening member 5. Accordingly, the second plate 2 may easily transfer the pressure change according to the thickness change of the object to be measured to the pressure measuring portion 6 described later.

The pressure measuring portion 6 may be disposed between the second plate 2 and the third plate 3 and may measure pressure applied by the second plate 2.

The pressure measuring portion 6 according to the embodiment may include a plurality of load cells. Each load cell may be connected to a control unit (not illustrated), and accordingly, the control unit may numerically calculate and display the pressure change of the battery cell 100, which is an object to be measured, based on a signal input from the load cell.

In the heating unit 20, at least a portion of a portion from which heat is dissipated may be disposed to face the electrode lead 120 so as to be in thermal contact with the electrode lead 120. Accordingly, the heating unit 20 may be disposed such that at least a portion of the heat dissipating portion may face the electrode lead 120 and may transfer thermal energy to the electrode lead 120.

In the embodiment, "thermal contact" may indicate that two independent members may transfer thermal energy through a heat transfer process. Specifically, thermal energy generated in the first member, the heating unit 20, may be transferred to the electrode lead 120 of the second member, the battery cell 100.

Accordingly, the battery cell 100 may reach a temperature at which thermal runaway is initiated by continuously receiving thermal energy from the heating unit 20.

The heating unit 20 may be configured to directly transfer thermal energy to the electrode lead 120 of the battery cell 100. Accordingly, in the battery cell 100, significant amount of most thermal energy may be concentrated on the electrode lead 120.

The heating unit 20 in the embodiment may use flames to supply thermal energy to the battery cell 100 side. Accordingly, the heating unit 20 may include a device for continuously generating flames by burning fuel, such as a gas torch or a burner.

The heating unit 20 may be disposed such that flames may be in direct contact with the electrode lead 120 or may be supplied to a position adjacent to the electrode lead 120. Accordingly, the device 10 in the embodiment may supply thermal energy to the battery cell 100 by heating the electrode lead 120 of the battery cell 100.

The heating unit 20 may locally heat the electrode lead 120. However, an embodiment thereof is not limited thereto, and various modifications may be made, such as heating a predetermined region of the electrode lead 120.

As thermal energy is continuously supplied to the electrode lead 120, thermal energy may be continuously supplied to the electrode assembly 130 connected to the electrode lead 120, the electrolyte containing the electrode assembly 130, and the case 110 accommodating the electrode assembly 130 and electrolyte.

The heating unit 20 in the embodiment may be disposed below the electrode lead 120. To this end, in the embodiment, the heating unit 20 may include a nozzle 22 for generating flames and may be disposed on the external side of the third plate 3. Specifically, the heating unit 20 may be disposed in a position facing the electrode lead 120 in the third plate 3, and to this end, the third plate 3 may be formed with a larger area than that of the second plate 2.

The heating unit 20 may include a plurality of nozzles 22, and the plurality of nozzles 22 may be selectively used to correspond to the position of the electrode lead 120. A fuel pipe 23 for supplying fuel may be connected to each nozzle 22. Each fuel pipe 23 may include a valve (not illustrated) for blocking the supply of fuel. Accordingly, fuel may be selectively supplied to a specific nozzle 22 among the plurality of nozzles 22 using the valve.

In the description below, a process of heating the battery cell 100 by the heating unit 20 in the embodiment will be described.

First, the battery cell 100, the object to be measured, may be disposed between the second plate 2 and the first plate 1, and the spacing distance between the first plate 1 and the third plate 3 may be fixed through the fastening member 5. In this case, the spacing distance between the first plate 1 and the third plate 3 may be defined as a distance at which constant pressure (hereinafter, referred to as reference pressure) is applied to the load cell.

Subsequently, the electrode lead 120 of the battery cell 100 may be heated using the heating unit 20.

The thermal energy supplied through the heating unit 20 may be concentrated in the electrode lead 120. Also, the heat of the electrode lead 120 may be transferred to the electrode assembly 130, electrolyte, and the case 110 connected to the electrode lead 120.

The thermal energy of the electrode lead 120 may be transferred to the electrode assembly 130 through the electrode tab 135, and accordingly, the temperature of the electrode assembly 130 may be increased. Depending on a material, the separator of the electrode assembly 130 may be reduced at about 150° C. Accordingly, the electrode assembly 130 may begin to deform by heat at about 150° C.

Also, the heat transferred to the electrode lead 120 may increase the temperature of the electrolyte. The electrolyte may be rapidly vaporized at about 100° C. to 120° C., and in this process, the heat supplied to the electrode assembly 130 may be continuously transferred to the electrolyte, such that the electrolyte may vaporize before the separator is reduced, and the internal pressure of the battery cell 100 may increase.

The heat transferred to the case 110 may increase the temperature of the case 110. As described above, the case 110 may include a first sealing portion **115*a* attached to the electrode lead 120. Since the first sealing portion 115*a* is disposed closer to the thermal contact point of the electrode lead 120 than the electrode assembly 130 or the electrolyte, the thermal energy of the electrode lead 120 may be intensively transferred to the first sealing portion 115*a***.

Accordingly, the first sealing portion **115*a* may be softened by thermal energy, and accordingly, bonding strength between the first sealing portion 115*a* and the electrode lead 120 may be reduced. As described above, when the internal pressure of the battery cell 100 increases due to vaporization of the electrolyte, the first sealing portion 115*a*, of which bonding strength is reduced due to the internal pressure, may be easily peeled off from the electrode lead 120. Accordingly, gas formed by the vaporization may be discharged to the outside through a gap between the first sealing portion 115*a* and the electrode lead 120**.

When the gas is discharged, as described above, the thermal energy of the electrode lead 120 may be concentrated in the electrode assembly 130, such that the temperature of the electrode assembly 130 may rise rapidly thereafter. Accordingly, the separator may be reduced at a temperature of about 150° C.

When the separator is reduced, the positive electrode plate **131*a* and the negative electrode plate 131*b*** may be in contact with each other and a short circuit may occur.

While thermal energy is supplied, the pressure measuring portion 6 may measure a change in internal pressure of the battery cell through a load cell. When the internal pressure of the battery cell 100 increases due to the vaporization of the electrolyte, the battery cell 100 may support the first plate 1 and may press the second plate 2 toward the pressure measuring portion 6 side. Accordingly, a pressure greater than the above reference pressure may be applied to the pressure measuring portion 6. Similarly, when the internal pressure of the battery cell 100 decreases as gas is discharged, the pressure applied to the pressure measuring portion 6 may decrease, such that the pressure measuring portion 6 may measure the corresponding pressure change.

Since the device 10 in the embodiment configured as described above may supply thermal energy to the electrode lead 120, a short circuit may occur after the gas vaporized by the electrolyte is discharged to the outside of the battery cell 100. Accordingly, in the event of a short circuit, excessive explosion due to the electrolyte or the vaporized gas of the electrolyte may be prevented.

Alternatively, thermal energy may be supplied to another portion (e.g., accommodation space region) other than the electrode lead 120. In this case, heat may be supplied through a heater or a heating element such as a heating wire, rather than flames.

However, when thermal energy is directly supplied to the accommodation space 113, the softening of the sealing portion 115 may not occur rapidly as in the embodiment.

Accordingly, even when the internal pressure of the battery cell 100 increases due to the vaporization of the electrolyte, gas may not be discharged smoothly. In this case, when the circuit is shorted, the electrolyte or the vaporized gas may combust, causing an excessive explosion or flames.

Differently from the above example, the device 10 in the embodiment described above may transfer thermal energy through the electrode lead 120, such that the vaporization of the electrolyte and the softening of the sealing portion 115 may be performed together. Accordingly, when the internal pressure of the battery cell 100 is increased, the separation of the sealing portion 115 and the discharge of gas may be performed in sequence, thereby preventing unnecessary increase in explosion or flames due to electrolyte or a gas vaporized by the electrolyte.

Also, the device 10 in the embodiment may measure the pressure change of the battery cell 100 while the battery cell 100 is heated, the device may be used in various circumstances.

However, an embodiment thereof is not limited thereto and various modifications may be made.

Figure 7:
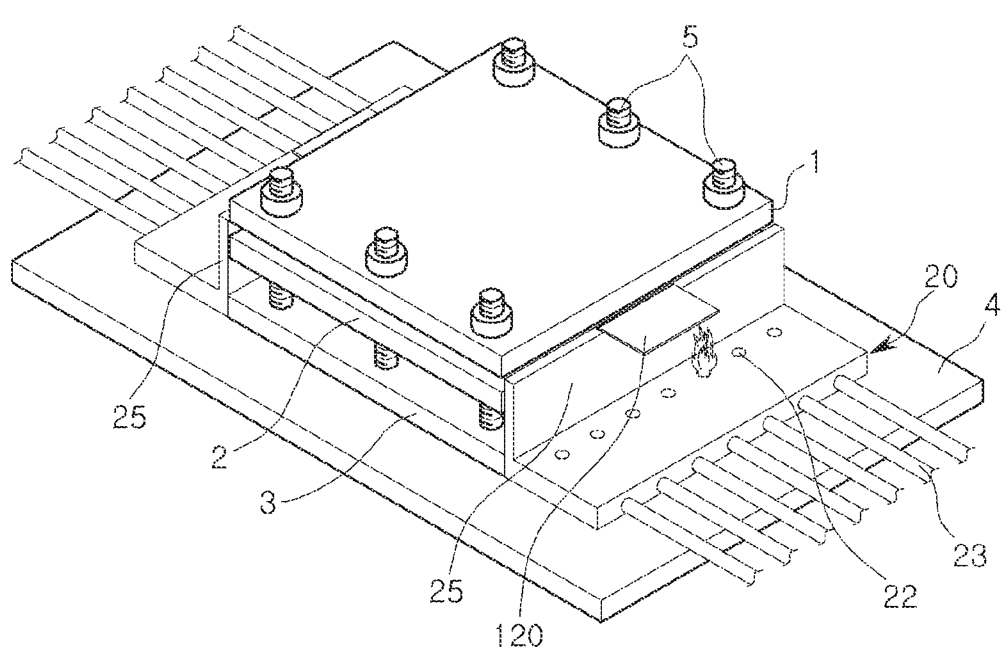
FIG. 7 is a perspective diagram illustrating a device for heating a battery cell according to another embodiment of disclosed technology.
Figure 8:
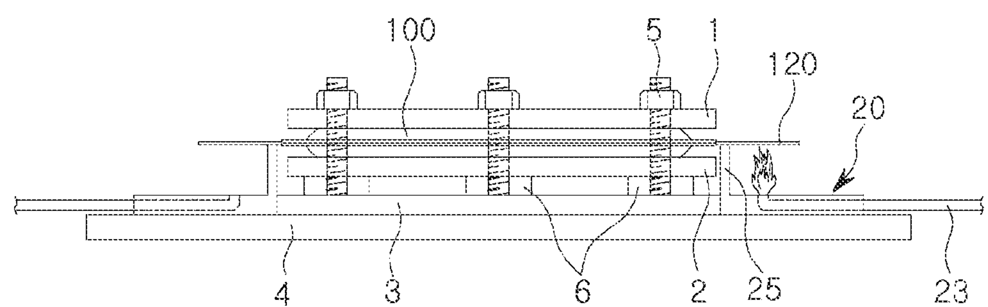
FIG. 8 is a diagram illustrating the device for heating a battery cell illustrated in FIG. 7, viewed laterally.

FIG. 7 is a perspective diagram illustrating a device for heating a battery cell according to another embodiment. FIG. 8 is a diagram illustrating the device for heating a battery cell illustrated in FIG. 7, viewed laterally.

Referring to FIGS. 7 and 8, the device 11 in the embodiment may include a blocking unit 25.

When flames of the heating unit 20 directly touches the case 110 or the heat of the flame directly affects the case 110, more thermal energy may be transferred to the case 110 than in the above-described embodiment. In this case, the sealing portion 115 may be peeled immediately, or unintended deformation may occur in the case 110.

To address the issues, the device 11 in the embodiment may include a blocking unit 25. The blocking unit 25 may be disposed between the heating unit 20 and the case 110 of the battery cell 100 and may block thermal energy of the heating unit 20 from being directly transferred to the case 110.

Accordingly, the blocking unit 25 may be formed of an insulating material or a flame retardant material for effectively blocking the flow of thermal energy.

Also, when gas formed by vaporized electrolyte is ejected toward flames of the heating unit 20, an explosion may occur outside the battery cell 100 due to the interaction between the gas and the heating unit 20, or flames may spread greatly. However, in the heating unit 20 in the embodiment, since the blocking unit 25 is disposed between the case 110 and the flame of the heating unit 20, the flow of gas discharged from the battery cell 100 may be blocked by the blocking unit 25. Accordingly, the blocking unit 25 in the embodiment may also perform a function of blocking gas from being discharged toward the heating unit 20 when gas is discharged from the battery cell 100.

Figure 9:
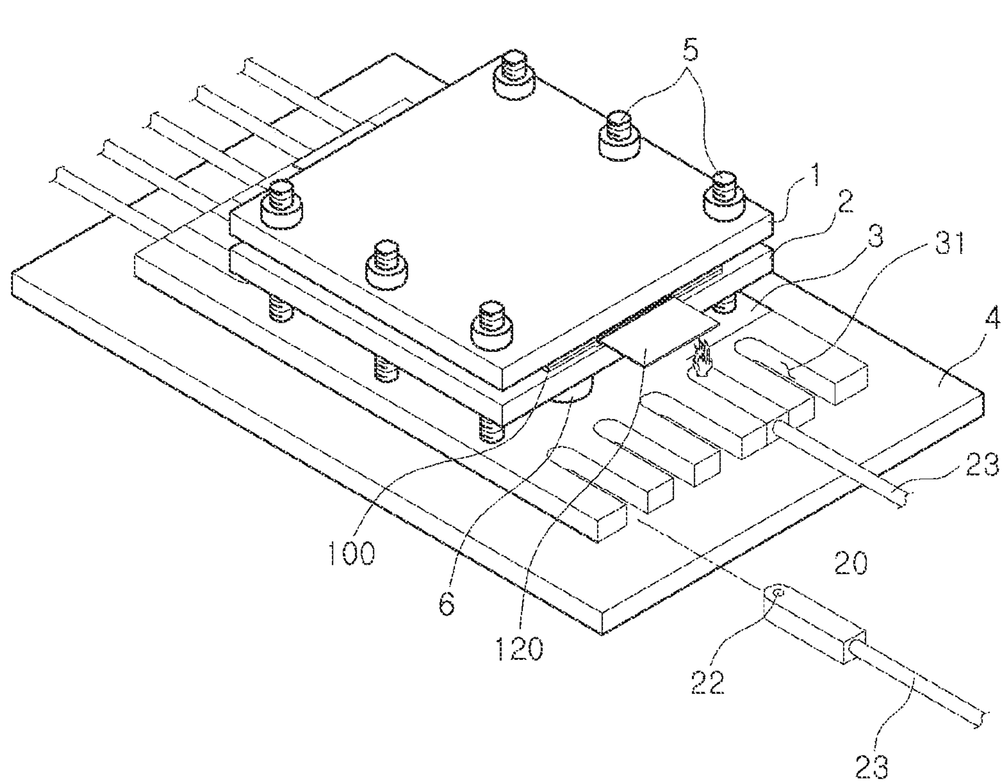
FIG. 9 is a perspective diagram illustrating a device for heating a battery cell according to another embodiment of disclosed technology.

FIG. 9 is a perspective diagram illustrating a device for heating a battery cell according to another embodiment.

Referring to FIG. 9, in the embodiment of the device 12, the third plate 3 may be formed to have a larger area than that of the second plate 2 such that at least a portion thereof may face the electrode lead 120. Also, the third plate 3 may include an accommodation portion 31.

The accommodation portion 31 may be formed in the shape of a groove and may be used as a space in which the heating unit 20 is accommodated. Accordingly, the accommodation portion 31 may be disposed in a position in which at least the portion thereof faces the electrode lead 120 of the battery cell 100.

A plurality of accommodation portions 31 may be provided. Accordingly, the heating unit 20 may be accommodated in at least one of the plurality of accommodation portions 31. Also, the heating units 20 may be disposed in the entirety of the accommodation portions 31 if desired.

The heating unit 20 in the embodiment may be formed in a shape to be inserted into the accommodation portion 31. Also, the heating unit 20 may be configured to be detachable from the accommodation portion 31.

Accordingly, in the device 12 in the embodiment, various heating units 20 including nozzles 22 of different sizes may be provided, and the heating units 20 may be used by being coupled to the third plate 3 if desired. Also, the heating units 20 including nozzles 22 of different sizes may be combined in various forms.

The device for heating a battery cell according to the embodiment may indirectly heat an electrode assembly by heating the electrode lead. To this end, the heating unit of the device for heating a battery cell may be disposed closer to the electrode lead than to the electrode assembly.

The device for heating a battery cell according to the embodiment may soften the sealing portion before the battery cell explodes, such that gas formed by vaporization of the electrolyte may be induced to pass through the sealing portion and may be discharged.

According to the aforementioned example embodiments, when the battery cell is heated, a short circuit may occur after gas formed by vaporized electrolyte to the outside of the battery cell. In the embodiments, in the event of a short circuit, an excessive explosion due to the electrolyte or the vaporized gas of the electrolyte may be prevented.

Only specific examples of implementations of certain embodiments are described. Variations, improvements and enhancements of the disclosed embodiments and other embodiments may be made based on the disclosure of this patent document.

What is claimed is:

1. A device for heating a battery cell including an electrode assembly accommodated in a case and an electrode lead connected to the electrode assembly and having at least a portion disposed outside of the case, the device comprising:

a cell fixing portion in which at least one battery cell is disposed; and a heating unit configured to supply thermal energy to the electrode lead, wherein the heating unit supplies thermal energy to the electrode lead disposed outside of the case, and wherein the heating unit continuously generates flames to supply thermal energy.

2. The device of claim 1, wherein the heating unit includes a nozzle in which flames are formed and a fuel pipe configured to supply fuel to the nozzle.

3. The device of claim 1, wherein the heating unit generates flames in a position spaced apart from the case by a predetermined distance.

4. The device of claim 1, further comprising:

a blocking unit disposed between the case and the heating unit and configured to block thermal energy from being directly transferred to the case.

5. The device of claim 1, wherein the electrode lead includes a negative electrode lead and a positive electrode lead, and the heating unit supplies thermal energy to the negative electrode lead.

6. The device of claim 1, wherein the cell fixing portion includes:

first and third plates having a fixed spacing distance therebetween;

a second plate disposed to move between the first plate and the third plate; and a pressure measuring portion disposed between the second plate and the third plate and configured to measure a change in pressure of a battery cell disposed between the first plate and the second plate.

7. The device of claim 6, wherein the cell fixing portion further includes a fastening member coupled to the first plate and the third plate and configured to fix a spacing distance therebetween.

8. The device of claim 6, wherein the heating unit is disposed to face the electrode lead on an external side of the third plate.

9. The device of claim 6, wherein the third plate is disposed such that at least a portion thereof faces the electrode lead, wherein at least one accommodation portion having a groove shape is formed in a portion of the third plate facing the electrode lead, and wherein the heating unit is coupled to the accommodation portion to be detachable therefrom.

10. A device for heating a battery cell including an electrode assembly accommodated in a case and an electrode lead connected to the electrode assembly and having at least a portion disposed outside of the case, the device comprising:

a cell fixing portion in which at least one battery cell is disposed;

a heating unit configured to supply thermal energy to the electrode lead; and a blocking unit disposed between the case and the heating unit and configured to block thermal energy from being directly transferred to the case, wherein the electrode assembly receives thermal energy through the electrode lead.

11. A method of heating a battery cell, the method comprising:

disposing a battery cell including an electrode assembly accommodated in a case and an electrode lead connected to the electrode assembly and having at least a portion disposed outside of the case on a cell fixing portion; and supplying thermal energy to the electrode lead, wherein the supplying the thermal energy includes heating the electrode lead disposed outside of the case using flames.

12. The method of claim 11, wherein the method further includes measuring a change in internal pressure of the battery cell through a load cell while thermal energy is supplied.

* * * * *